June 29, 1948. L. C. WEATHERS 2,444,077
POLYPHASE INDUCTION MACHINE AND CONTROL
Filed March 7, 1944 10 Sheets-Sheet 1

Inventor
Leland Clay Weathers
By Bacon & Thomas
Attorneys

June 29, 1948. L. C. WEATHERS 2,444,077
POLYPHASE INDUCTION MACHINE AND CONTROL
Filed March 7, 1944 10 Sheets-Sheet 2

Inventor
Leland Clay Weathers
By Bacon + Thomas
Attorneys

June 29, 1948.　　　　　　L. C. WEATHERS　　　　　　2,444,077
POLYPHASE INDUCTION MACHINE AND CONTROL
Filed March 7, 1944　　　　　　　　　　　　　　10 Sheets-Sheet 3
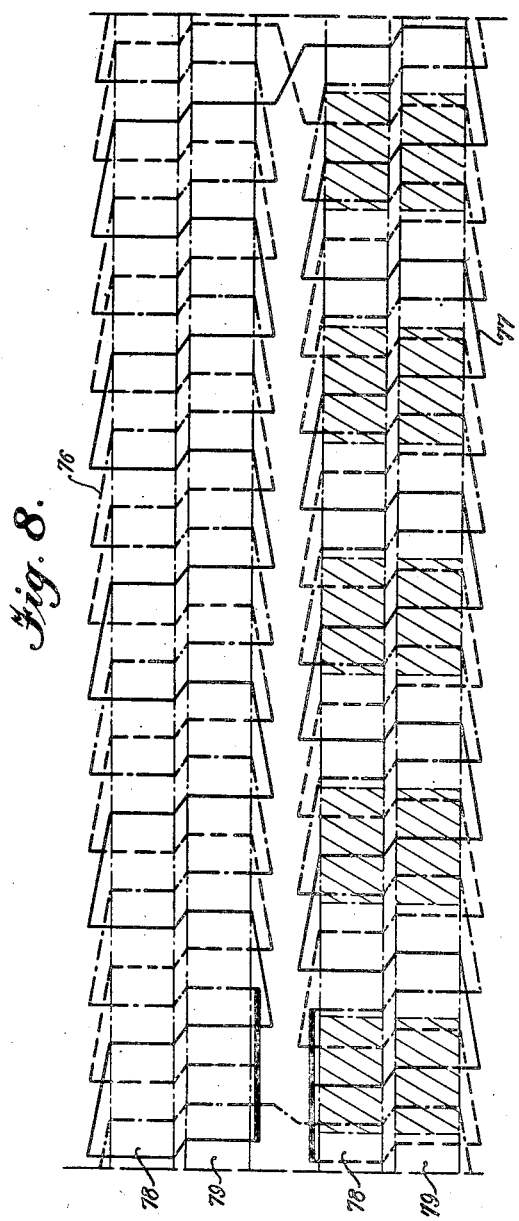
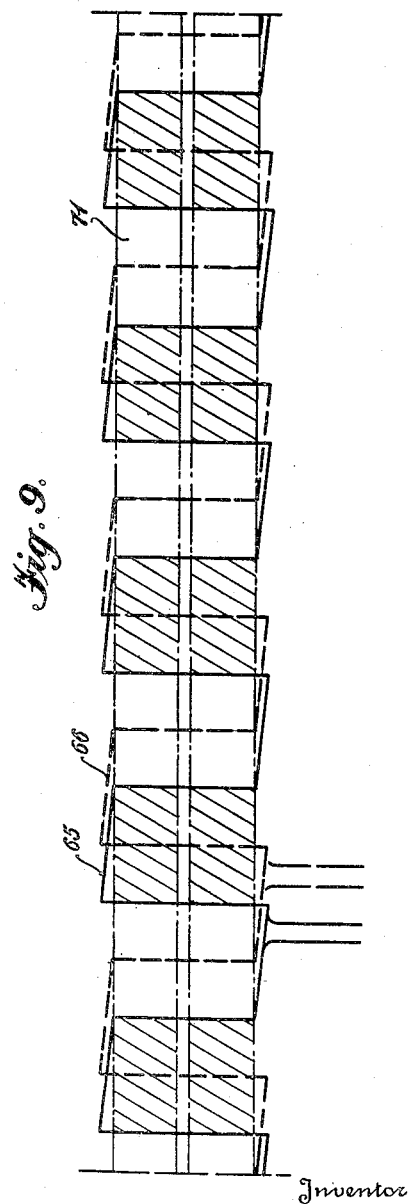
Inventor
Leland Clay Weathers
By Bacon & Thomas
Attorneys

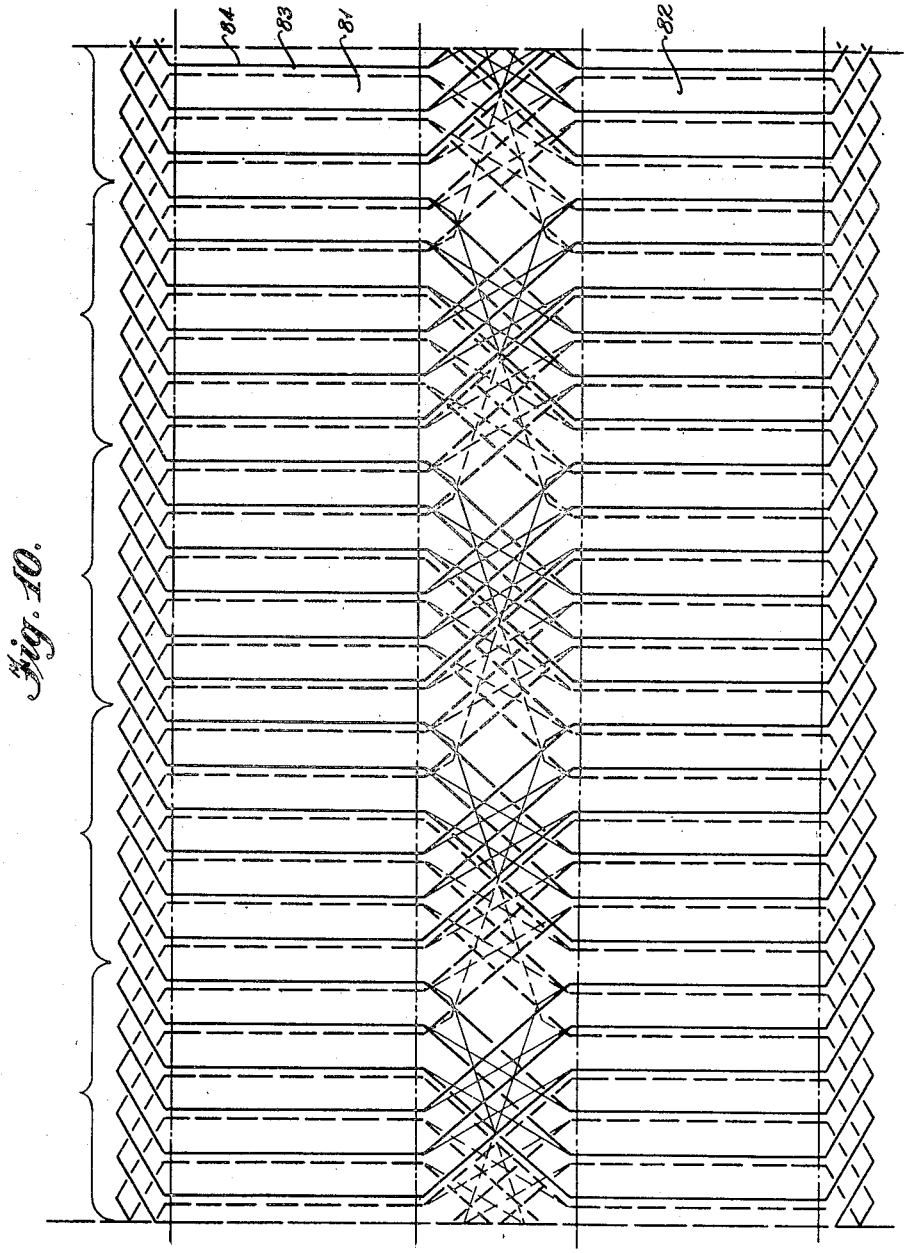

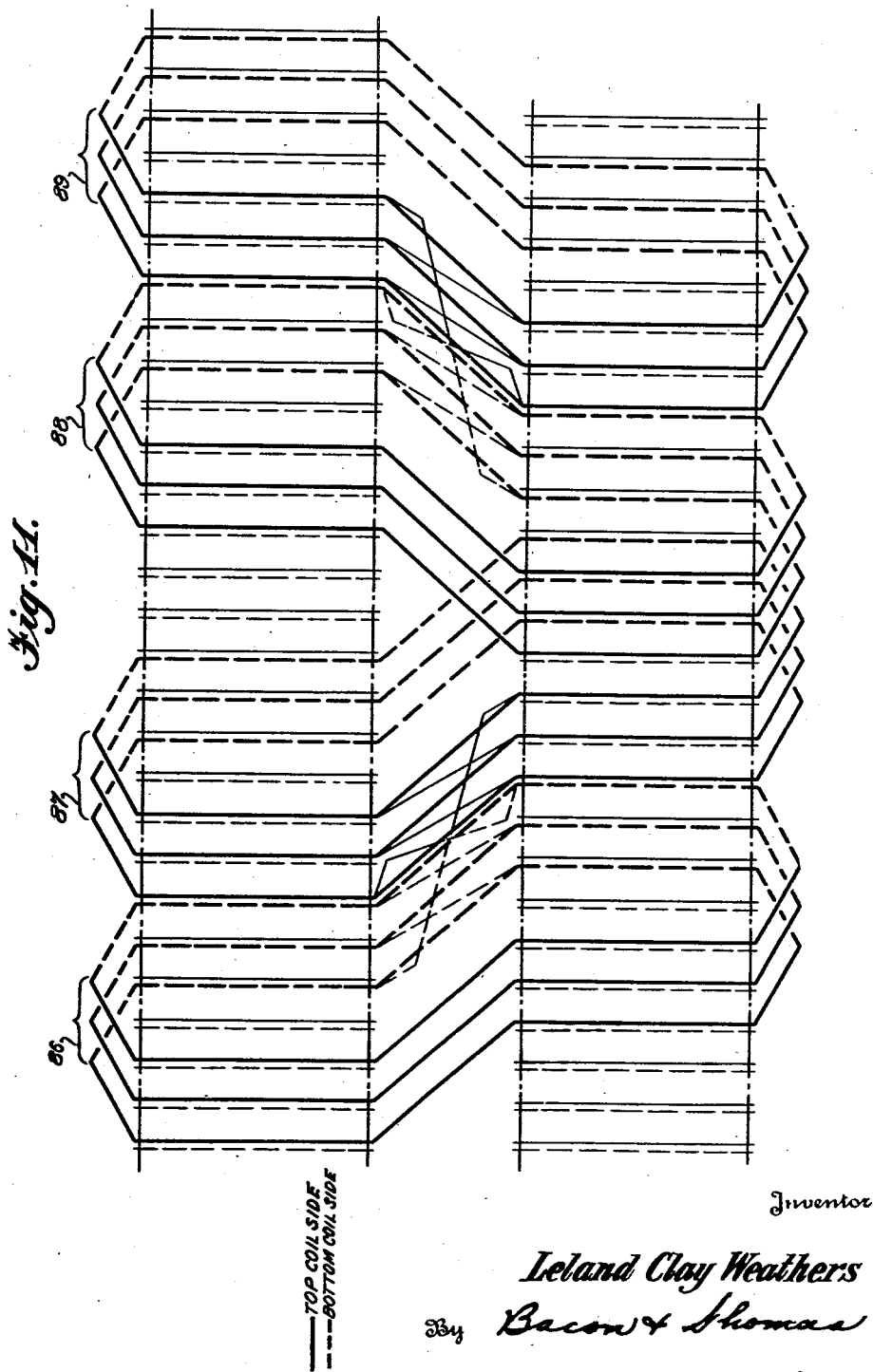

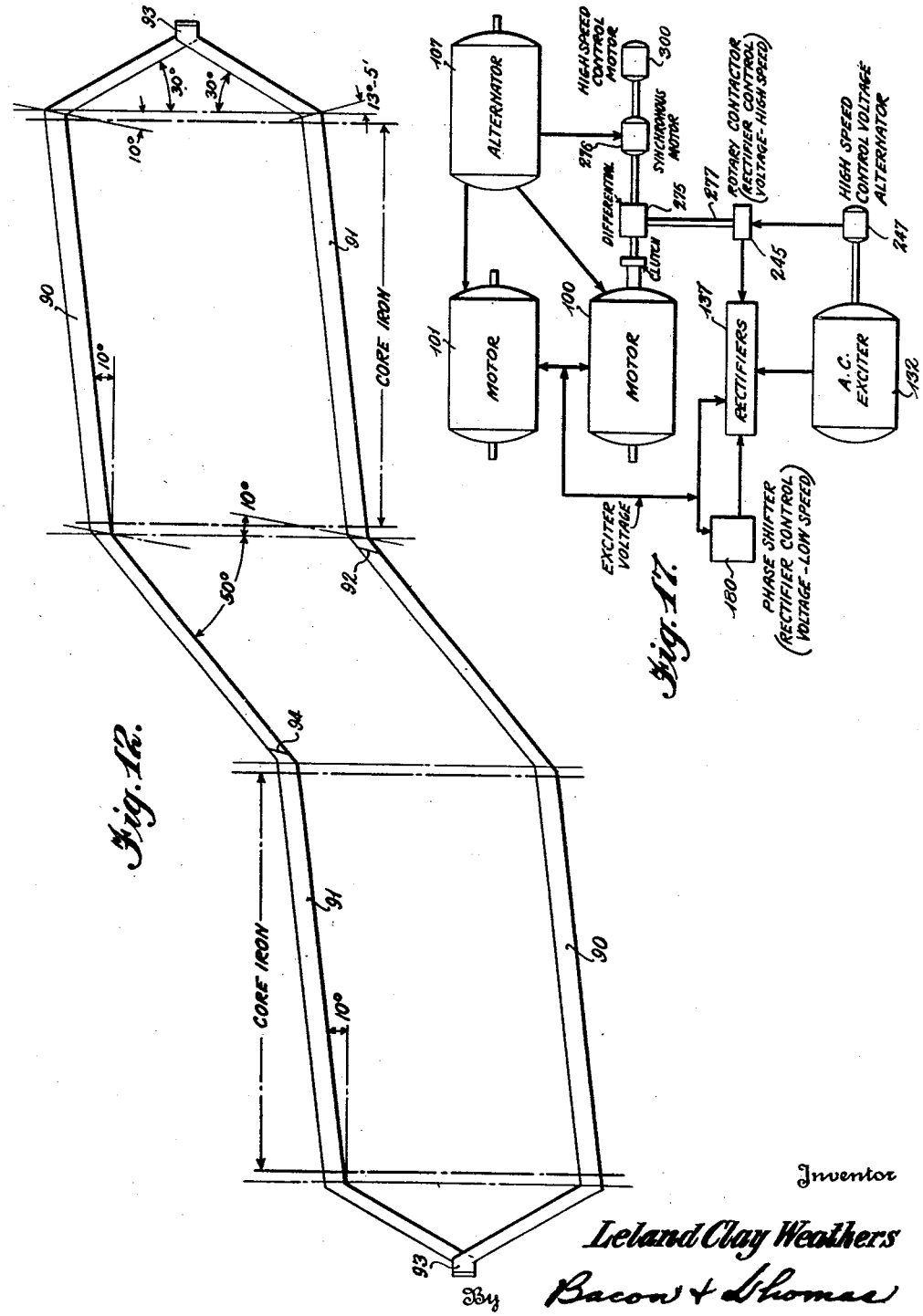

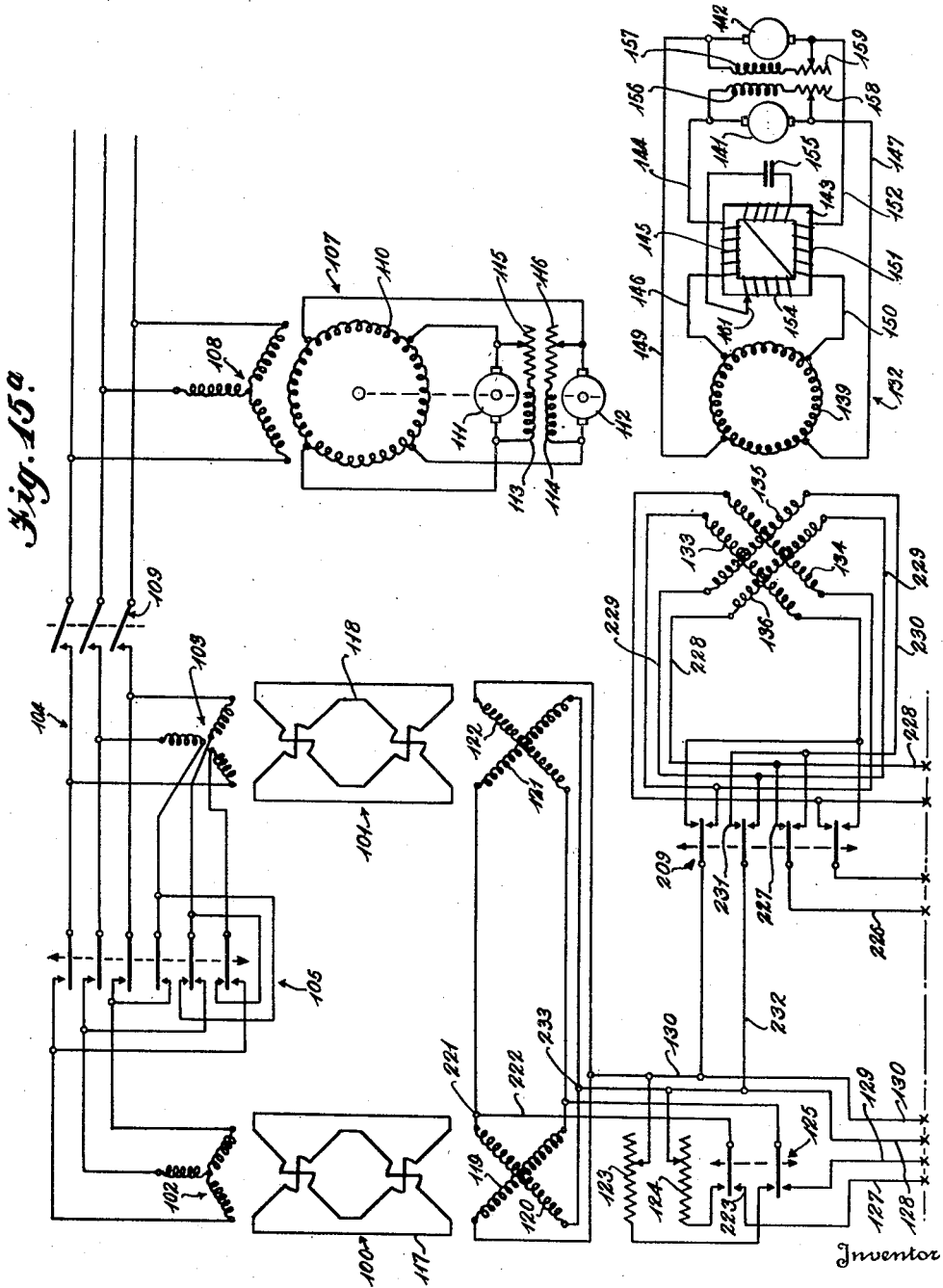

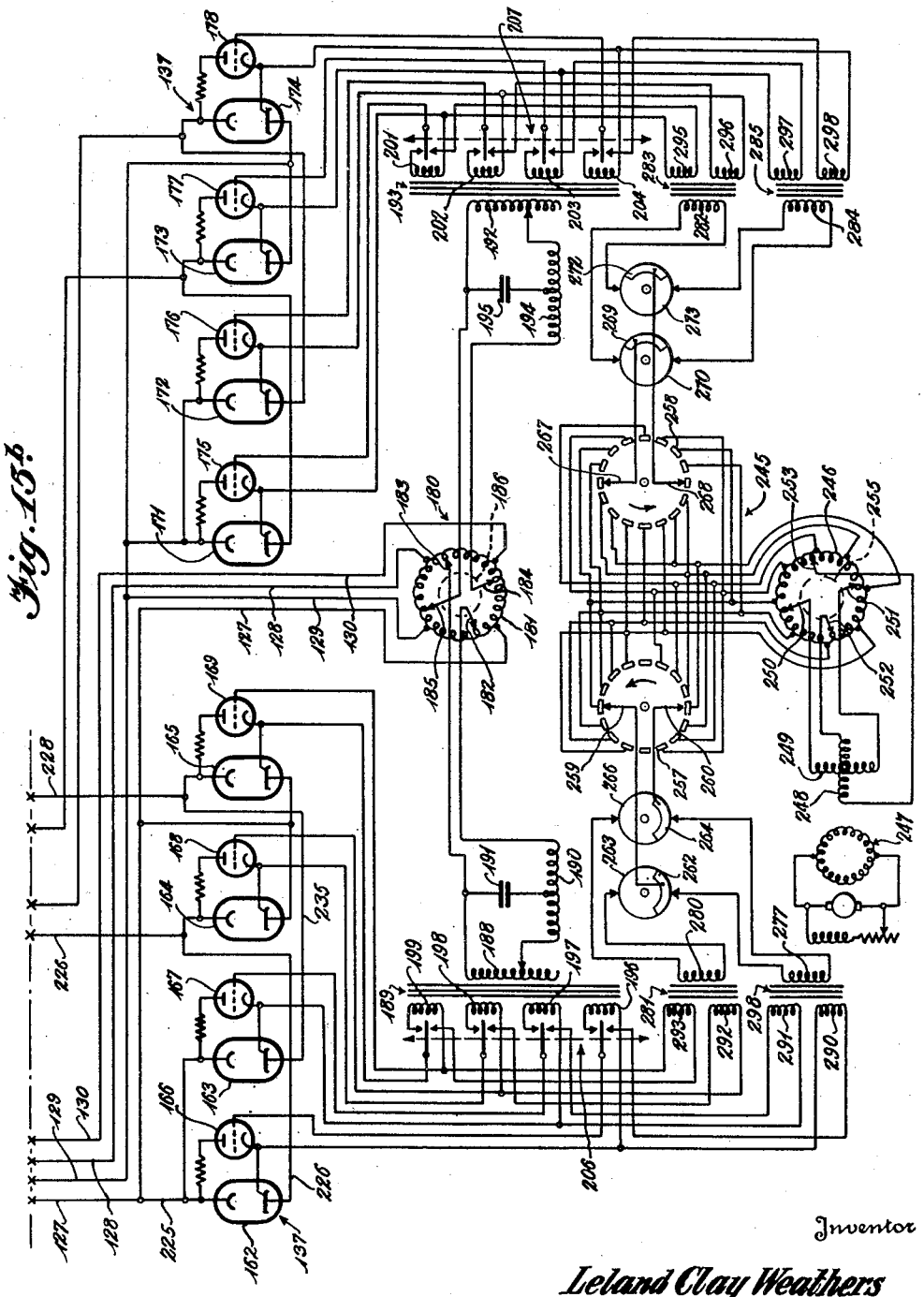

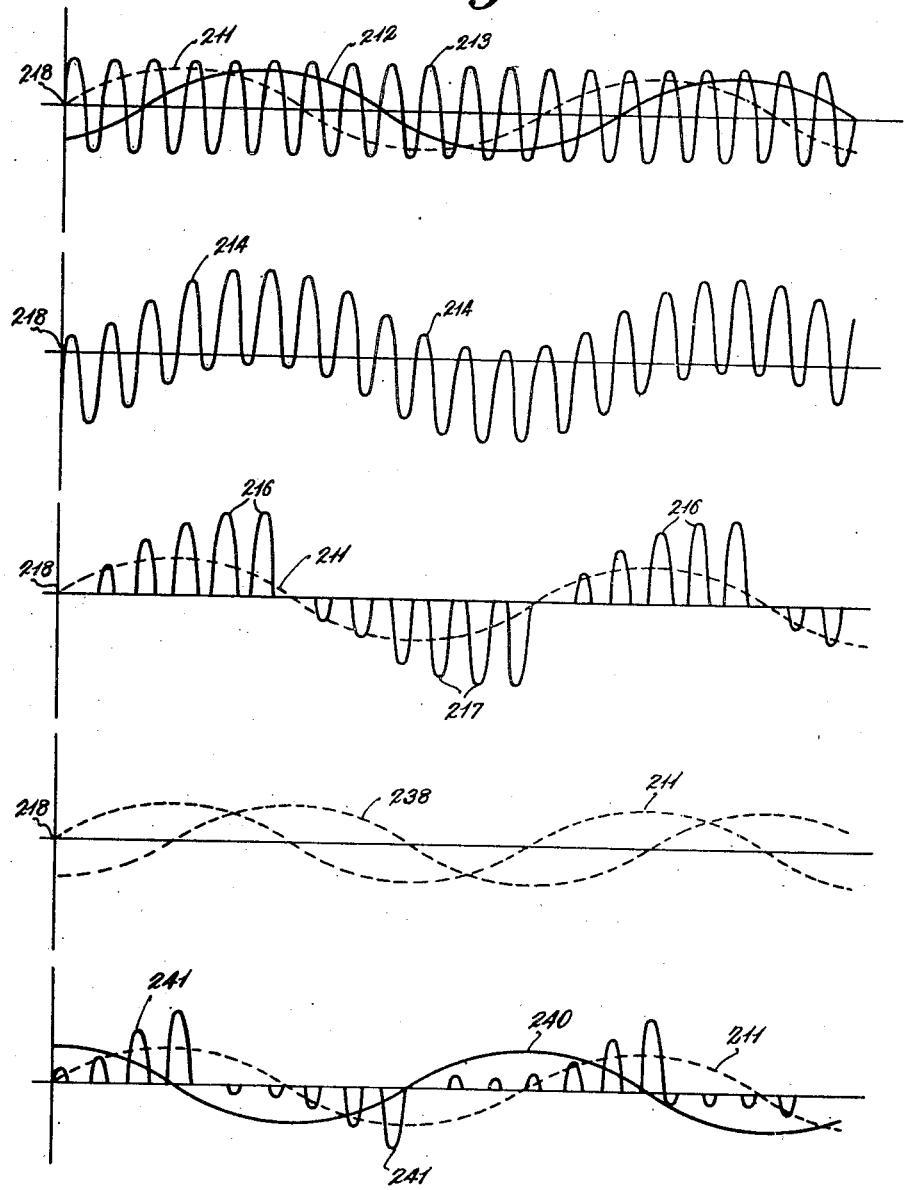

Patented June 29, 1948

2,444,077

UNITED STATES PATENT OFFICE 2,444,077

POLYPHASE INDUCTION MACHINE AND CONTROL eland Clay Weathers, Detroit, Mich., assignor to Vickers, Incorporated, Detroit, Mich., a corporation of Michigan Application March 7, 1944, Serial No. 525,407

11 Claims. (Cl. 318—197)

This invention relates to an improved dynamo electric machine and system and more particularly to a machine having a double stator and rotor construction and the systems in which the machine finds its chief utility.

The improved dynamo electric machine of the present invention includes a rotor divided into two axially aligned sections with interconnected bar windings upon the sections and axially aligned stators having separate windings. Machines in accordance with the present invention may be employed as wound rotor induction motors or generators, synchronous motors or generators, or self synchronous receivers and transmitters all without slip rings or other external connections to rotating parts.

One important application of the machines of the present invention is as a small induction motor which must be rapidly started, stopped and reversed, such as an induction motor for follow-up systems. In such systems the major load is usually an inertia load and in most cases the inertia of the rotor of the motor provides a large portion of the load of the system. In accordance with the present invention a motor is provided which has extremely high torque at low speeds and which has low inertia so that a much smaller motor can be employed to more rapidly operate a controlled member in accordance with a control member in a follow-up system.

The principles of the present invention also find utility in large wound rotor induction motors, particularly where it is desired to use a small diameter motor such as, for example, in ship propulsion. Furthermore, the principles of the present invention enable large-size synchronous generators, for example, hydro-electric generators, to be built without salient poles and with markedly increased stability under difficult operating conditions, for example, when the generators are connected to long transmission lines.

In general the dynamo electric machine of the present invention has two axially aligned rotors, each having a bar winding with crossed bar connections between the windings so that voltages induced in one rotor winding by relative rotation between the rotor and a magnetic field cause currents to flow in the other rotor winding which produce a rotating field in the same direction and at twice the speed of the relative rotation between the first rotor and the first mentioned magnetic field. At least one of the stator windings may be a conventional distributed alternating current winding having any number of phases, including single phase, and any desired number of pairs of poles. The other stator winding may be of any desired type, for example, a distributed winding for energization by direct current to produce a synchronous motor or generator, a phase wound winding to produce a wound rotor induction motor or self synchronous transmitter or receiver, or a short circuited winding for use of the machine as an induction motor or a short circuited self synchronous receiver.

An object of the present invention is, therefore, to provide an improved dynamo electric machine capable of being employed for a variety of uses, including synchronous motors and generators or wound rotor induction motors in which no slip rings are employed.

Another object of the invention is to provide an induction motor having high staring torque and a rotor with a relatively low moment of inertia.

Another object of the invention is to provide an improved dynamo electric machine capable of being employed as a synchronous motor of a generator of large size and having a continuous field iron structure instead of salient poles.

A further object of the invention is to provide an improved induction motor and system in which the motor is capable of being operated efficiently at a plurality of speeds.

Other objects and advantages of the invention will appear in the following description thereof made in connection with the following drawings of which:

Fig. 8 is a schematic diagram of a rotor connection which may be employed for small or medium sized machines;

Fig. 9 is a schematic diagram of a stator winding suitable for excitation by direct current in a synchronous motor or generator;

Fig. 10 is a schematic diagram of a rotor connection particularly suitable for large sized machines;

Fig. 11 is a view similar to Fig. 10 showing a portion of the winding of Fig. 10;

Fig. 12 is a plan view of a single coil of the winding of Figs. 10 and 11;

Figs. 15a and 15b together are a schematic diagram of machines in accordance with the present invention connected for efficient operation as induction motors at a plurality of speeds;

Fig. 16 is a diagram showing curves illustrating the operation of the motors connected as shown in Figs. 15a and 15b; and Fig. 17 is a diagram showing certain of the relations between the apparatus of Figs. 15a and 15b.

Figure 1:
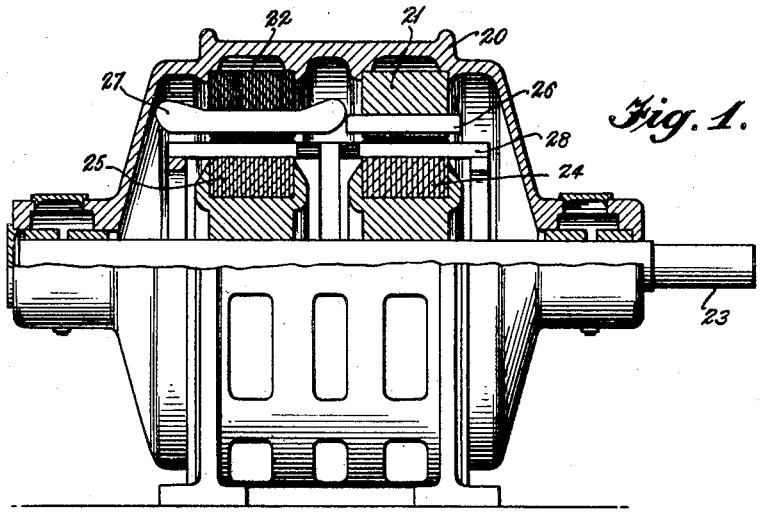
Fig. 1 is an elevation partly in section of a machine in accordance with the present invention.

Referring to Fig. 1: the machine of the present invention includes a frame 20 supporting in axial alignment a pair of stator iron structures 21 and 22. A shaft 23 may be journaled in the frame 20 to support a pair of rotor iron structures 24 and 25. The stator iron structure 21 supports a winding 26 in slots on the inner face thereof and the stator iron structure 22 supports a winding 27 also in slots on the inner face thereof. The rotor iron structures support an interconnecting bar winding 28 in slots on the periphery of the iron structures.

The machine selected for illustration in Fig. 1 is particularly adapted for synchronous motor or generator operation. In this application, winding 26 would be energized by direct current so that the iron structure 21 thereof need not be laminated. The winding 27, in the case of a synchronous motor or generator will have alternating currents therein of the line frequency. This would require an alternation of flux in the stator field structure 22 at the line frequency, thus requiring lamination of the iron thereof. The currents flowing in the interconnecting bar windings 28 are at half the frequency of the currents in the winding 27 and iron having thicker laminations may be employed in the rotor structures 24 and 25. Thus for 60 cycle operation of the machine of Fig. 1 the stator structure 22 may have "60 cycle" iron and the rotor structures may have "30 cycle" iron. It will be understood, however, that the type of iron employed in any of the stator or rotor structures will depend upon the frequency of the current flowing through the associated windings.

Figure 2:
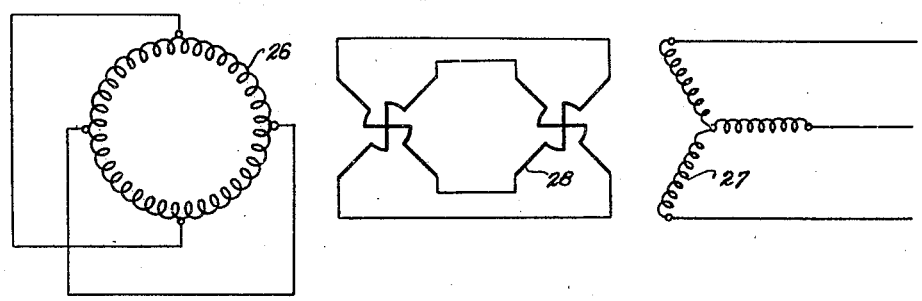
Fig. 2 is a schematic diagram of the connections of one modification of the machine of the present invention.

As shown in Fig. 2 a simplified convention has been adopted for the interconnected bar rotor winding 28 and this convention will be preserved throughout the case. The schematic diagram of Fig. 2 shows a conventional three-phase Y stator winding which may be the winding 27 of Fig. 1. The other stator winding 26 of Fig. 2 is, however, shown as a short circuited distributed winding. Such a winding would be employed for small size induction motors where the stator winding 27 is energized from an alternating current power line or in a short-circuited self synchronous receiver where the winding 27 is energized from a self synchronous transmitter.

Figure 3:
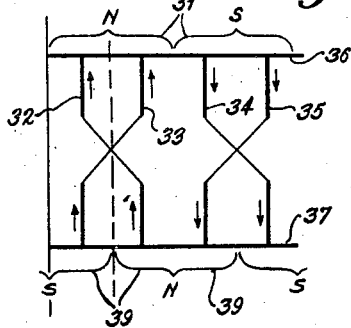
Figs. 3 and 4 are schematic diagrams of a developed simple rotor connection illustrating the rotation of the fields.
Figure 4:
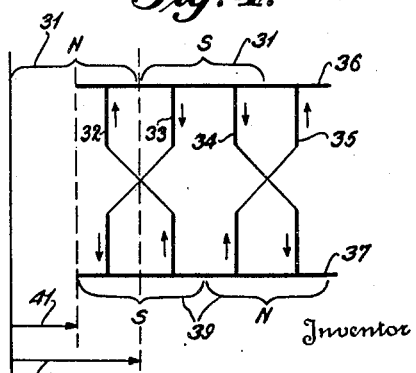

For purposes of explaining the principles of the invention a simplified interconnected bar winding is shown developed in Figs. 3 and 4 in which the brackets 31 indicate the instantaneous field set up by one of the stator windings, for example, the winding 27 of Fig. 2. The conducting bars 32, 33, 34 and 35 of the rotor winding are shown connected at each end to short circuiting rings 36 and 37. It will be noted that the bars 32 and 33 are crossed and that the same is true of the bars 34 and 25 and that there are two bars for each pole set up by the stator winding producing the field indicated by the brackets 31.

If the field indicated by the brackets 31 is assumed to be stationary and the rotor is moving to the right in Fig. 3 instantaneous currents in the bars 32 to 35 may be those indicated by the arrows adjacent the bars. The field in the other rotor produced by these currents may be that shown by the brackets 39. In Fig. 4 the field indicated by the brackets 31 is assumed to still be in the same position as in Fig. 3 and the bars 32 to 35, inclusive, have moved the distance of one-half pole to the right. The currents produced by voltages induced from the field due to movement of the bars to the right may be that shown by the arrows adjacent the bars. The field set up in the iron of the other rotor may be that shown by the brackets 39 (Fig. 4). It will be noted that the field shown by the brackets 39 has moved a distance of one pole rather than one-half pole so that the field indicated by the brackets 39 rotates relative to the field shown by the brackets 31 at twice the speed of rotation of the rotor. That is to say the rotor has moved relative to the field indicated by the brackets 31 the distance of one-half pole as shown by the length of the arrow 41 (Fig. 4), while the field indicated by the brackets 39 has rotated a distance of one pole as shown by the arrow 42 (Fig. 4).

Figure 5:
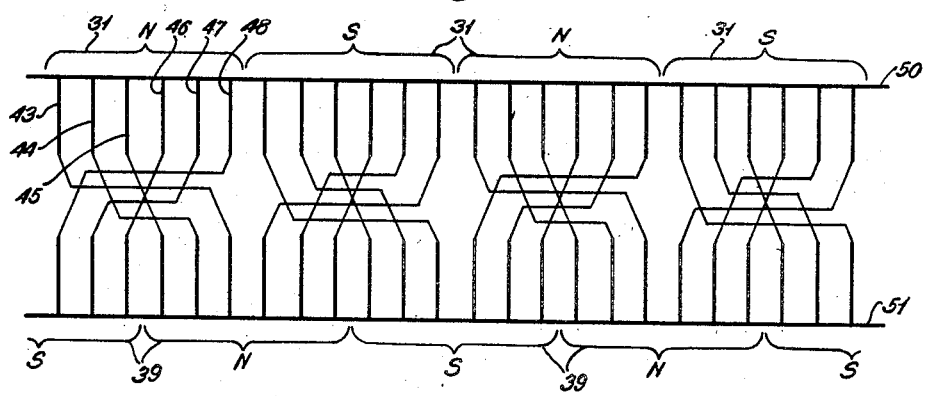
Fig. 5 is a view similar to Fig. 3, illustrating a modified rotor connection.

The employment of only two bars per pole as illustrated in Fig. 3 would cause a fluctuation of the lengths of the poles in the rotor iron to produce extreme slot harmonics. A rotor winding capable of being used on small machines is shown in Fig. 5 in which there are six bars per pole. The developed rotor winding of Fig. 5 shows a four pole machine but it is apparent that the winding of Fig. 5 could be adapted to any desired number of pairs of poles. In Fig. 5 the brackets 31 again represent the poles produced by one of the stator windings and the brackets 39 again represent the poles produced in the other rotor due to currents flowing in the bars 43, 44, 45, 46, 47 and 48 of the rotor winding by voltages induced from the field indicated by the brackets 31 due to relative movement between the bars 43 to 48, inclusive, and the field indicated by the brackets 31.

All of the bars 43 to 48, inclusive, may be connected at their ends to short circuiting rings 50 and 51 and all of the bars may be of the same length by properly arranging the crossed portions of the bars. For example, bars 43 and 48 may follow the shortest possible path between the two rotors. The bars 44 and 47 may be looped under the bars 43 and 48 and the bars 45 and 46 may be looped under all of the bars 44, 47, 43 and 48. It is important to maintain all of the rotor bars as nearly as possible the same length in order that their resistance may be the same and the average current flowing in each one be the same as the average current in every other bar. While only six bars per pole are shown in Fig. 5, it is apparent that a larger number of bars per pole may be employed in the actual construction of the machine if desired. The action of the fields with the rotor winding of Fig. 5 is substantially the same as that explained in more detail with respect to Figs. 3 and 4 but the lengths of the poles induced in the rotor remain more uniform and slot harmonics are markedly reduced with a larger number of bars per pole.

When the motor thus far described is connected as shown in Fig. 2 with the winding 27 energized with alternating current and the winding 26 short circuited, the motor tends to rotate at half the speed of a conventional induction motor having the same number of poles. By providing the motor of the present invention with rotors of the same diameter and length as such a conventional induction motor, the torque is doubled as is also the mass of the rotor structure and the power output remains the same. For the driving motor of follow-up systems, for example, for training or elevating guns on mounts on board a war ship the motor is required to start, stop and reverse rapidly. The roll and pitch of the ship requires that the gun mounts must be constantly changing their train and elevation in order to hold on the target throughout the roll. For this service overcoming the inertia of the rotor of the motor may result in the use of as high as 50% of the power. In other words, it takes one-half of the power the motor develops to start and stop its own rotor. The kinetic energy stored in the rotor is proportional to $Iw^2$ where $I$ is the moment of inertia and $w$ is the angular velocity. In the double rotor motor just described the moment of inertia of the rotor is doubled but the velocity is cut in half for a motor developing approximately the same power. As the velocity is a squared term the net result is to cut the inertia in the motor due to its own rotor in half. Since the load which the motor must handle has been thereby lessened a motor of smaller power can be employed which means a smaller motor with a still greater reduction in inertia load. The gear ratio between the motor and the driven member would, of course, be changed so that the motor could drive the gear mount at the same speed while running at a lesser speed.

Except for the change in inertia load and the reduced speed with a given number of poles, the motor connected as shown in Figure 2 has substantially the same torque speed characteristic as a conventional induction motor. That is to say that if additional resistance were placed in the winding 26 the torque speed curve would be altered in substantially the same manner as a conventional motor. The introduction of resistance shifts the position of the maximum on the speed torque curve but it does not substantially alter the value of the maximum torque until this maximum torque occurs at zero speed and then further resistance reduces the maximum torque. This is due to the fact that inserting resistance into the secondary winding of a wound rotor induction motor tends to bring the rotor current more closely into phase with the voltages induced in the rotor, but at the same time reduces the total current flowing in the rotor so that the reduction in current counterbalances the improved phase relationship between the voltages and currents.

Figure 6:
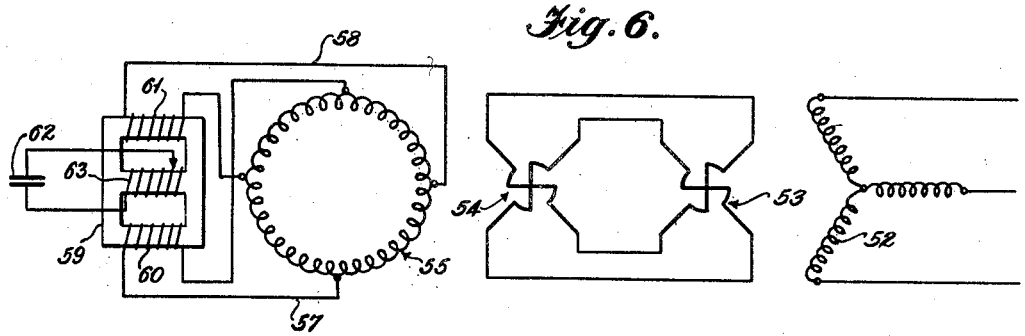
Fig. 6 is a view similar to Fig. 2 illustrating the winding connections of an induction motor arranged to produce high torque at low speeds.

Referring to Fig. 6: The torque produced by interaction between the alternating current winding 52 and the winding 53 of the rotor cooperating therewith is proportional to the product of the voltage induced in the winding 53 from the field produced by the winding 52 and the component of the current flowing in the winding 53 which is in phase with this voltage. Similarly the torque produced by interaction between the winding 54 of the second rotor and second stator winding 55 is proportional to the product of the voltage induced in the second stator winding 55 from the field produced by winding 54 and the component of the current flowing in the winding 55 which is in phase with the induced voltage. The phase relationships of the voltages and currents in the rotor windings 53 and 54 are largely determined by the electrical characteristics of the circuit of the winding 55. It is possible to correct the power factor of the winding 55 by inserting a capacitive reactance in the circuit connected thereto. This power factor can only be unity for a single speed as the frequency of the current in the winding 55 depends upon the slip between the field produced by the winding 54 and the winding 55. For zero speed this frequency is equal to the frequency of the voltage supplied to the winding 52 and for synchronous speed, which is one-half of the speed of the rotation of the field induced by the winding 52; this frequency is zero.

A poly-phase induction motor for purposes of analysis acts the same as a single phase transformer with a variable resistance connected to its secondary. The actual resistance of the rotor remains substantially constant but the effective value of this resistance referred to the primary is a function of the speed, the approximate function being $$\frac{R_2}{1-s}$$

where $R_2$ is the actual resistance of the secondary and $s$ is the speed, considering synchronous speed as unity speed. It is apparent that the value of this function is equal to $R_2$ when $s$ equals zero and that it becomes infinite when $s$ equals 1. The secondary winding also contains inductive reactance as well as resistance, the actual inductive reactance decreasing as the speed increases becoming zero when $s$ equals 1. However, the inductive reactance of the secondary when referred to the primary is also a function of the rotor speed and remains substantially constant. It is apparent that as the speed increases the phase angle between the currents in the secondary and the voltage induced therein decreases as the speed increases. The current in the rotor as well as the phase angle between the current and voltage is at a maximum when the speed is zero and both the current and the phase angle decrease as the speed increases, both becoming zero when the speed is unity. Except for magnetizing current, substantially the same thing occurs in the primary winding since the secondary resistance referred to the primary increases as the speed increases and becomes infinite at unity speed while the secondary inductive reactance referred to the primary remains substantially constant. There are other minor factors which enter in, such as a variation in the actual resistance of the rotor due to skin effect, etc., but these effects are of minor importance.

Since the phase angle between the induced voltage and current in the secondary approaches zero at synchronous speed, this can be considered a condition of resonance although the frequency is then zero. The torque becomes zero because the voltage is zero and no current flows. It is not possible to change this condition of resonance to some other speed by inserting resistance in the secondary winding but by inserting capacitive reactance into the secondary winding it is possible to produce the condition of resonance or unity phase angle between the voltages and currents of the secondary at substantially any speed lower than synchronous speed. A desirable way of accomplishing this is illustrated in Fig. 6 in which the winding 55, which is substantially the functional equivalent of the secondary winding of a wound rotor induction motor, has two external circuits 57 and 58 connected across the winding in quadrature. The circuit 57 includes a winding 60 on one leg of a three leg transformer core 59. Circuit 58 includes a similar winding 61 on the other outside leg of the core 59 and a condenser 62 is connected across a tertiary winding 63 on the center leg of the core 59. By this arrangement the circuits 57 and 58 are equal impedance quadrature circuits, which provide for balanced conditions within the motor and increase its stability. The winding 55 is preferably a closed winding connected so that any currents flowing therein must also flow through the external circuits 57 and 58. It will be apparent that two separate windings may be employed instead of the single closed winding 55, each having its terminal connected to one of the external circuits 57 and 58.

The condenser 62 can be made of the necessary capacity to neutralize the reactance at any desired speed and produce a condition of resonance at such speed so that the currents flowing in the winding 55 are in phase with the voltages induced therein. This means that the only factor resisting flow of current in the winding 55 is the actual resistance of the winding and the external circuits connected thereto. Since the current is in phase with the voltage all of the current is power current and maximum torque will be produced at the speed at which the resonant condition is established. This maximum torque, which can be most easily produced at a relatively low speed because of the higher slip frequency, is much greater than the maximum torque which can be produced by inserting resistance into the winding 55. The phase angle of the currents and voltages in the winding 55 is reflected into the windings 53 and 54 so that the voltages and currents therein are also substantially in phase, thus producing maximum torque both in the rotor having the winding 53 and in the rotor having the winding 54.

For a motor adapted for quick starting, stopping and reversing, the torque should be maximum at very low speeds. As a specific example, it is possible to bring the circuits of the winding 55 into resonance at $1/30$ of synchronous speed, that is to say at about $\frac{1}{32}$ of the rated speed. Under these conditions the frequency in the winding 55 is 58 cycles per second for a motor to which 60 cycle voltage is applied to the winding 52. A condenser 62 of substantial capacity must be employed for this purpose but the capacity rating of the condenser can be lowered by employing a greater number of turns for the winding 63 on the core 59 than for windings 60 and 61 to produce a step-up transformer action. Thus a condenser with a reasonably small capacity can be employed.

With the current in the winding 55 in phase with the voltage, the torque is substantially proportional to the square of the current in this winding. If, for example, as is conventional in induction motors, the current at this low speed is permitted to be four times normal full load current, the low speed torque will be 16 times the normal full load torque, and since there are two rotors and stators in the motor of the present invention, there is substantially 32 times normal full load torque at $\frac{1}{32}$ of rated speed. Thus the motor develops its rated power at the low speed. As the speed of the motor increases the frequency in the circuits of the winding 55 decreases so that the inductive reactance decreases, and the capacitive reactance increases, thus departing from the condition of resonance above referred to. At the same time the voltage induced in the winding 55 decreases due to the decrease in slip so that the currents in this winding decrease and the torque decreases. Since the power is equal to the product of the speed and torque, the power developed by the motor may be maintained substantially constant up to the normal speed of the induction motor. There is a leading current flowing through the inductive reactance of the rotor which produces a voltage rise so this somewhat compensates for the decrease in a voltage due to the decrease in slip speed. The power factor of the motor is extremely good and it takes a leading current for speeds above the resonant condition above referred to. The motor, of course, will not operate continuously at high load and low speeds without overheating since the currents in the winding of the motor are high but a motor of this type used particularly for follow-up systems is not required to operate continuously for extended periods of time at a low speed.

Instead of producing the resonant condition referred to at $\frac{1}{32}$ normal speed, it may be produced under starting conditions when the frequency in the winding 55 is the same as the frequency in the excited winding. In this case extremely large starting torques will be developed. Since extremely large starting torques are developed, the motor for driving a given follow-up system may be made very small as compared to conventional induction motors so that the inertia of the rotor may be likewise made very small. In this case the major inertia load on the motor will be the inertia of the driven members instead of the rotor itself accounting for approximately half of the inertia load as in conventional motors for follow-up systems.

Although a 60 cycle motor has been dealt with specifically, it is apparent that motors designed for 120 or 180 cycles or even higher, may be employed where motor at such frequencies is available thus decreasing the size of the condenser necessary for producing resonance of the unity power factor for low speeds or under starting condition. Such higher frequency operation also reduces the necessary size of the dual excitation transformer 59. Thus the motor described will develop substantially rated horsepower at all speeds for short intervals of time and will run at high speeds continuously developing rated horsepower.

Figure 7:
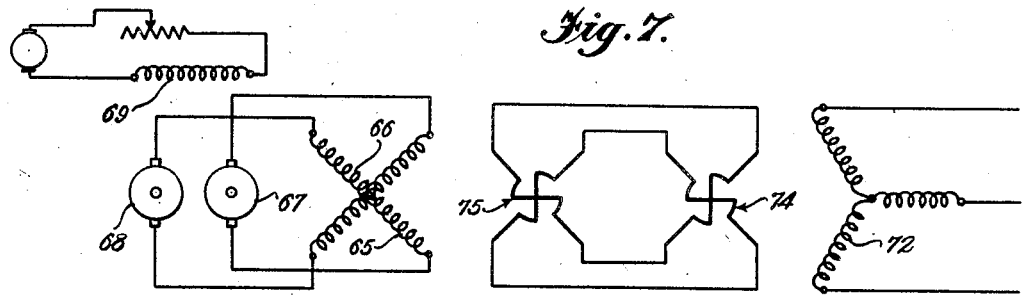
Fig. 7 is a view similar to Fig. 6 illustrating wiring connections for the machine employed as a synchronous motor or generator having direct current excitation.

The machine of the present invention also has major utility for large size generators, such, for example, as hydroelectric alternators. Referring to Fig. 7, such machine preferably comprises separate quadrature exciting windings 65 and 66, each excited from a separate source of direct current power. For example, the winding 65 may be excited from the armature 67 of a D. C. exciter and the winding 66 may be excited from the armature 68 of a D. C. exciter. Both of the armatures 68 and 67 may be upon the same shaft and rotated in the field produced by a single field winding 69. The exciting windings 65 and 66 are preferably distributed windings in the sense that no salient poles are employed. Such windings may be simple wave wound bar windings such as shown in Fig. 9. In Fig. 9 the exciting windings 65 and 66 are shown developed on the iron of one stator 71 provided with the usual slots (not shown).

The alternating current winding 72 on the other stator may be of any conventional or usual polyphase winding and is shown as a three-phase Y connecting winding. The relatively simple rotor windings 74 and 75 shown in Fig. 5 are not in general suitable for large sized machines due to harmonics induced in the output of the generator.

An improved winding which can be employed for medium sized machines is shown in Fig. 8. This winding comprises two separate three-phase Y connected windings 76 and 77 on the two rotors with the windings interconnected in reverse phase relation to give the effect of the crossed bar windings of Figs. 3, 4 and 5. As shown, these windings are wave wound with a 30° displacement and the iron of each of the structures is divided into two parts 78 and 79 with the segments thereof displaced from each other 30° or half of the angle between the slots. This construction provides a good wave shape in the output voltage and the Y connection will block the flow of the third harmonic and all of its multiples in the rotor windings, thus preventing any phase unbalance in fundamental voltage induced in the output winding of the generator such as the winding 72 of Fig. 7. Slot harmonics would still be present but the slots in the rotor can be skewed to largely eliminate such harmonics. Thus winding is simple and does not require the conventional type of coil with its long coil ends. The coils can be shaped as shown in the diagram so that the end connections of one coil overlie the end connections of adjacent coils. A third harmonic and its multiples will, however, appear in the output voltage of the generator due to saturation effects in the second stator and rotor since the Y connection of the rotor winding blocks the flow of third harmonic current therein which could compensate for the saturation effects just mentioned. Thus the winding of Fig. 8 could be employed for medium sized machines but would not be suitable for large sized generators.

However the rotor windings of Figs. 10 to 14, inclusive, eliminate all of the objections as to phase unbalance and harmonics in the output voltage. The developed rotor bar windings corresponding to somewhat more than four poles of the stator are shown in Fig. 10 along with the connection between the bars on the two rotors. In the particular winding selected for illustration, each of the iron structures 81 and 82 is provided with twelve slots per pair of stator poles and each slot contains two coil slides 83 and 84.

In Fig. 11 portions of the windings of Fig. 10 are shown to illustrate the manner of positioning and connecting the coils. Thus the group of coils indicated at 86 and the group of coils indicated at 87 comprise the winding in the direct axis for one pair of poles. The coils of the groups 86 and 87 are connected in series to form a closed circuit. The groups of coils indicated at 88 and at 89 form the winding in the quadrature axis for the next pair of stator poles and these coils are likewise connected in series to form a closed circuit. The winding is in effect a two phase winding, each phase closing on itself and is lap wound with two coil slides per slot and with a 2/3 coil pitch. For each pair of poles there are two groups of three coils each for each phase.

Figure 13:
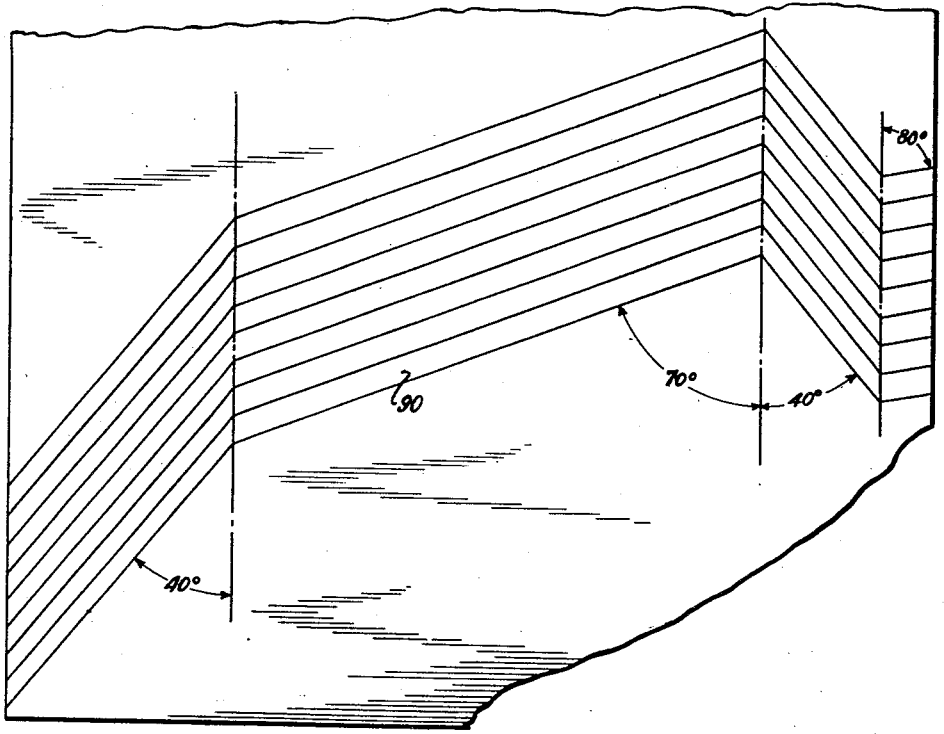
Fig. 13 is a view showing how a portion of the coil of Fig. 12 may be cut from sheet copper or other conducting material.
Figure 14:
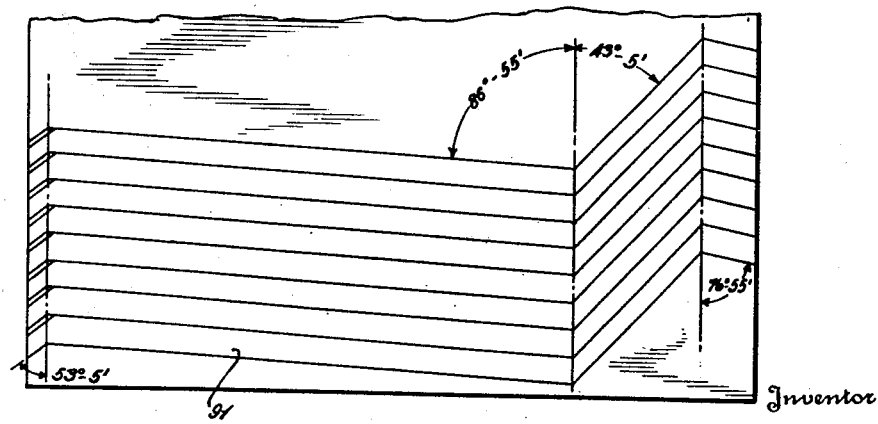
Fig. 14 is a view similar to Fig. 13 showing how another portion of the coil can be cut from sheet material.

Fig. 12 illustrates the actual structure of a suitable coil for a large sized machine and as shown in Figs. 13 and 14 the bars making up the coil may be stamped from sheet material with substantially no waste. Thus the portions 90 of the coil shown in Fig. 12 are the same as the portions 90 of Fig. 13, and the portions 91 of the coil shown in Fig. 12 are the same as the portions 91 shown in Fig. 14. The portions 90 and 91 of the lower portion of the coil in Fig. 12 may be welded, brazed or otherwise connected, preferably by a butt connection at 92. It will be appreciated that the coils of the type shown in Fig. 12 may be employed in partially closed slots by first tipping the coil sides, inserting them in the slots, and then later connecting the coil sides at the ends of the coils. The connection 93 at the ends may be seam or lap welding or brazing. As shown in Figs. 10 and 11, all of the connection between the coils may be made between the rotor structure and for this purpose the coil may be left open at 94 in Fig. 12 so that suitable end connections may be welded or brazed thereto. It will be noted that the portions of the coils outside of the slots may be made of smaller cross section without waste and this is desirable as these portions of coils are more readily cooled so that the temperature throughout the length of the coil is maintained substantially uniform. As indicated in Fig. 12 the slots in the rotors are preferably skewed to eliminate, as far as possible, slot harmonics.

The third harmonic and all of its multiples which are induced in the first rotor due to saturation effects, are canceled out by the use of the 2/3 coil pitch. The saturation of the iron of the second rotor and stator will cause harmonics to be present in the excitation current which flows in the rotor windings. If these saturation harmonics were blocked such as is the case with a three phase Y connected winding on the rotor, a distorted wave shape would be produced in the output stator winding. Since the two phase rotor winding illustrated allows these saturation harmonics to flow in the rotor winding, harmonics due to saturation do not appear in the output voltage.

The problem of harmonics in a structure of the present invention is difficult because there is a likelihood of harmonics being produced due to both the coupling between the stator field and the first rotor, and between the second stator and the stator armature. It was found that a rotor winding such as is shown in Fig. 5, when used in a synchronous generator will result in the third, fifth, seventh, etc., harmonics in the voltage of the stator armature winding of decreasing magnitude as the order of the harmonic increases, and since some of these are of negative phase sequence an unbalanced phase condition will also be produced which could not be tolerated in a large machine. The winding shown in Fig. 8 will result in a negative phase sequence second harmonic of substantial magnitude which will also produce phase unbalance. All these harmonics can be reduced to a considerable extent by properly skewing the slots in the rotor, but are sufficient that they cannot be tolerated in a large machine. However, the two phase rotor winding of Fig. 10 having a 2/3 coil pitch substantially completely eliminates harmonics so that an extremely good wave form with phase balance is produced by such a winding.

One of the chief uses of the machine just described is for a water wheel generator. The water turbine is inherently a slow speed machine and a generator driven therefrom must be of large diameter to secure sufficient peripheral velocity of the rotor. Also, because the penstocks cannot be closed suddenly due to water hammer, the hydro generator must be able to withstand at least twice the normal speed, which means that very great centrifugal forces come into action. In such machines which are almost universally of the vertical type, the field is generally on the rotor, and heretofore it has always been of the salient pole type with or without Amortiesseur windings in the pole faces. The salient pole pieces are dovetailed into a ring which is supported by the spider on the shaft, which ring may be rigidly fastened to the spider, or may float on the spider at the same time being keyed thereto. In most cases the pole pieces of these large generators have an axial dimension which is much greater than their circumferential dimension and usually at least two spiders are secured to the shaft for carrying the pole pieces and rings. Machines of the type of the present invention may be constructed of the same diameter with the same length of stator and rotor split into two sections. For the same frequency and speed one-half of the number of poles of conventional machines can be employed on each stator and rotor. Since the rotor construction may be continuous rings of iron with slots therein instead of salient pole pieces, there can be no cantilever stresses due to salient pole pieces under conditions of rapid acceleration or deceleration. Each rotor can be made much lighter so that centrifugal forces are decreased and each pole piece can be made more nearly rectangular which makes for winding efficiency. Also, much of the iron in the machine can be of lower frequency than the normal output frequency of the generator. Such generators, particularly when connected to long transmission lines through step-up transformers, must have extremely low reactance in order to maintain the system stable. This requires that the machines have an actual kva. capacity in some instances as much as 50% greater than their rated kva. capacity. Because of this increased size the machines have a very high value of short circuit current and the protecting circuit breaker structures and bus structures must be made sufficiently large to handle and break these currents under short circuit conditions. The machines of the present invention have increased stability, one reason being the dual excitation applied thereto so that the machine may be rated very closely to its kva. capacity and also the short circuit current is very much less than that of conventional machines so that a large saving in bus structure and circuit structure may be secured. At light loads the machine of the present invention can float on the line as an induction generator with the transmission line supplying the excitation current. Furthermore, no rings or brushes are required.

As shown diagrammatically in Figs. 15 to 17, the machines of the present invention also find utility as large sized motors, particularly where the diameter of the motor must be limited such as in ship propulsion. In ship propulsion, particularly for naval vessels, a plurality of propeller motors, usually four, are employed and such propeller motors must operate at a relatively low speed. Low speed motors are usually of large diameter but for use as propeller motors, the diameter is limited by the vertical depth of the bottom of the hull below the propeller shaft, unless the propeller shafts slant down at too great an angle for efficient operation.

Also naval vessels in general have two main speeds, the design or top speed, and the cruising speed which is generally about $6/10$ of the top speed. The power required for the cruising speed is much less than that for the top speed being about one-fourth of the power required for top speed. Ordinarily for a quadruple screw ship with four motors and, for example, four generators, one generator can drive all four motors at cruising speed as far as power output is concerned. In order for the generator to develop sufficient power to drive all four motors it must be operated at its rated voltage but if the motors are operated at their rated voltage their speed will be too great. It is possible to operate the induction motors in series so as to operate them at one-half voltage. Since the torque of a conventional induction motor varies very nearly as the square of the voltage, operating the motors at one-half voltage will cause their torque to be reduced to one-fourth. This is too small since the torque should be approximately $6/10$ squared or $36/100$ of the torque at rated voltage. Also induction motors operated at one-half rated voltage and at low speed are extremely inefficient. Nevertheless by the systems shown in Figures 15 to 17 the motors of the present invention may be efficiently operated at low speed and at one-half of the rated voltage to produce the requisite torque for the cruising speed.

If a conventional induction motor is operated at $6/10$ normal speed at half rated voltage, the current in the secondary will be much greater than normal full load current. In this case the slip is usually about ten times as great as the full load slip at rated voltage. Thus a large voltage is induced in the secondary winding of the induction motor even though the applied voltage is less than rated voltage. This causes larger currents to flow in the secondary winding. However this current is not as effective in producing torque as is the current at full load and rated voltage because the current lags behind the induced voltage in the secondary winding. The primary current is of course very large due to the large secondary current. For this reason the potential method of speed control for induction motor causes the motor to overheat.

In accordance with the present invention only current which is in phase with the voltage induced in the winding which corresponds to the secondary winding in conventional induction motors is allowed to flow in this winding so that all of the current therein is torque producing. The amount of current is materially reduced and the primary current correspondingly decreased. This is accomplished as shown in Figures 15a and 15b by applying excitation to the windings 119 to 122 of the motor at a higher frequency than the currents produced therein by induction, using exciting voltage of sufficient amplitude to cause the current in the windings 119 to 122 to pass through zero at least once in each cycle of the exciting voltage and interposing grid controlled rectifier tubes in the excitation circuit under control of the voltage induced in the windings 119 to 122 so that the only current allowed to flow is in phase with the voltage induced in these windings.

Referring to Figure 15a a pair of induction motors 100 and 101 are provided with primary windings 102 and 103, respectively positioned on one stator of each motor. The primary windings may be connected to a poly-phase alternating current line 104. A suitable contactor 105 may be provided so as to connect the primary windings 102 and 103 to the line 104 either in series or parallel. When the central contacts of the conductor 105 are in their uppermost position the windings 102 and 103 are connected to the line in parallel and when these contacts are in their lowermost position the windings 102 and 103 are connected in series. The poly-phase alternating current line may be supplied from an alternator 107 provided with an output winding 108 connected to the line 104 through a main contactor 109 and a field winding 110 suitably excited by direct current power, for example, from two independent sources of D. C. 111 and 112 connected in quadrature to field winding 109. The sources 111 and 112 may comprise independent exciters or two direct current armature windings in the same machine. The degree of excitation applied to the field winding 110 may be controlled by the excitation of the exciter fields 113 and 114, for example, through variable resistors 115 and 116.

The induction motors 100 and 101 preferably have double rotors with cross connected bar windings as indicated at 117 and 118, respectively. The winding on the other stator of the motor 100 preferably comprises two separate quadrature windings 119 and 120 and the winding on the other stator of the motor 101 preferably comprises two separate quadrature windings 121 and 122. Thus the windings 119 and 120 and 121 and 122 of the motors 100 and 101 are two phase windings and it will be apparent that other types of two phase windings or other poly-phase windings may be employed. These windings of the two motors are preferably interconnected as shown in Figure 15a, for example, the winding 119 of the motor 100 may be connected across the winding 122 of the motor 101 and the winding 120 of the motor 100 may be connected across the winding 121 of the motor 101. This insures that the motors 100 and 101 operate in synchronism as any difference in phase between the voltages induced in corresponding secondary windings of the motors will result in the flow of currents which bring the rotors of the two motors into phase.

With this connection substantially no currents circulate between the windings 119 and 122 or 120 and 121 of the two motors as the voltages induced therein are in phase opposition and no power will be developed by the motors unless a path for currents flowing in these windings is provided. During starting of the motors or while running as induction motors at rated voltage and rated load or less, such a path may be provided by the resistors 123 and 124. A contactor 125 may be provided for connecting resistor 123 across windings 119 and 122 and resistor 124 across windings 120 and 121. This connection is accomplished when the central contacts of the contactor 125 are in their uppermost position.

When the central contacts of the contactor 125 are in their lowermost position conductor 127 is connected to one terminal of windings 120 and 121, conductor 128 is connected to the other terminal of windings 120 and 121, conductor 129 is connected to one terminal of windings 119 and 122 while conductor 130 is connected to the other terminal of windings 119 and 122. As more fully described hereafter, this connects the windings 119 to 122, inclusive, of the motors 100 and 101 to an exciter 132 provided with the alternating current windings 133 to 136, inclusive. A set of grid controlled rectifier tubes 137, shown in Figure 15b, is associated with the windings 119 to 122 of the motors 100 and 101 and with the windings 133 to 136 of the exciter 132 to control the currents flowing therein, as also more fully hereafter described.

The exciter 132 also includes a field winding 139 which may be energized by direct current power, for example, from armatures 141 and 142 of direct current generators connected in quadrature to the winding 139 through coils on a dual excitation transformer 143. The circuit from the armature 141 may be traced through conductor 144, coil 145 of the transformer 143, conductor 146, winding 139 and conductor 147 back to the armature 141. The circuit from the armature 142 may be traced through the conductor 149, winding 139, conductor 150, coil 151 on the transformer 143, and conductor 151 back to the armature 142. The transformer 143 is provided with a tertiary winding 154 having a condenser 155 in series therewith. Voltage control of the output of the exciter 132 can be accomplished by varying the excitation of fields 156 and 157 of the direct current machines through variable resistors 158 and 159, respectively.

The exciter 132 is operated to produce voltages in its windings 133 to 136, inclusive, which are of higher frequency than the slip voltages induced in the windings 119 to 122, inclusive, of the machines 100 and 101 and preferably the exciter 132 is operated to produce a voltage having a frequency higher than that applied to the windings 102 and 103 of the motors 100 and 101. For example, if windings 102 and 103 of the motors 100 and 101 are energized with 60 cycle alternating current power the frequency of the machine 132 may be 120 or 180 cycles, or higher. There need be no definite relation between the frequency of the exciter 132 and the frequency applied to the windings 102 and 103 of the motors 100 and 101 by the alternator 107 except that the frequency of the exciter 132 should be as high as commercially feasible. Currents at the high frequency flow in the windings 133 to 136, inclusive, of the exciter 132 and these currents react upon the winding 139 thereof to produce voltages and currents at the high frequency in this winding. Such currents flow through the windings 145 and 151 of the dual excitation transformer 143 and, by transformer action, in the circuit including a condenser 155. By balancing the capacitive reactance of the condenser 155 against the inductive reactance in the circuits including the windings 119 to 122 of the motors 100 and 101, windings 133 to 136, inclusive, and the winding 139 and associated circuits of the exciter 132, a condition of resonance may be secured so that the only impedance to the high frequency current is the resistance of the various circuits. The winding 154 of the dual excitation transformer 143 may have a greater number of turns than the coils 145 and 151 thereon so as to act as a step-up transformer to the condenser 155 thus enabling a condenser with a smaller capacity to be employed and the effective capacitive reactance of the condenser 155 may be varied by employing a variable tap 161 for the winding 154.

The exciter 132 must be of sufficient size to supply considerable power, and the windings 133 to 136, inclusive, thereof must be capable of carrying the current flowing in windings 119 to 122 of the motors 100 and 101. The set of grid controlled rectifier tubes 137 may include power tubes 162, 163, 164 and 165 of the "Ignitron" type with control tubes 166, 167, 168 and 169, respectively, of the "Thyratron" type associated therewith, and also may include power tubes 171, 172, 173 and 174, with their associated control tubes 175, 176, 177, and 178, respectively. For cruising speed operation the firing of the rectifier tubes may be controlled by the slip voltage in the windings 119 to 122, inclusive, of the motors 100 and 101. This may be accomplished through a phase shifter 180. The phase shifter 180 may include a polyphase winding 181 connected to the windings 119 to 122, inclusive, of the motors 100 and 101 through the conductors 127 to 130, inclusive.

The phase shifter 180 is shown as being of the commutator type in which a plurality of brushes 182, 183, 184 and 185 are simultaneously rotatably adjustable as indicated by the dotted circle 186. Oppositely disposed brushes 182 and 183 are connected across the primary 188 of a control transformer 189 through a low pass filter, including an inductance 190 and condenser 191, and oppositely disposed brushes 184 and 185 may be connected across the primary winding 192 of a control transformer 193 through a low pass filter including an inductance 194 and condenser 195. By this arrangement a voltage of the frequency of the slip voltage in the motors 100 and 101 and corresponding to the voltage induced in the windings 120 and 121 may be applied across the primary winding 188 of the transformer 189 and a voltage of the slip frequency corresponding to the voltage induced in windings 119 and 122 of the motors 100 and 101 may be applied across the winding 192 of the transformer 193.

Since the higher frequency produced by the exciter 132 is also present in the circuit including the phase shifter 180, the low pass filters, including the inductances 190 and 194, are employed to insure that no substantial amount of this higher frequency voltage reaches the transformer windings 188 and 192. Separate secondary windings 196, 197, 198 and 199 on the transformer 189 are provided for each of the control tubes 166 to 169, respectively, and similarly separate control windings 201, 202, 203 and 204 on the transformer 193 are provided for each of the control tubes 175 to 178, respectively.

A contactor 206 is provided for disconnecting the secondary windings 196 to 199, inclusive, of the transformer 189 from the control tubes 166 to 169, inclusive, for purposes which will hereinafter appear, and similarly a contactor 207 is provided for disconnecting the secondary windings 201 to 204, inclusive, of the transformer 193 from the control tubes 175 to 178, inclusive.

When the central contacts of contactors 206 and 207 are in their uppermost position the secondaries 196 to 199, inclusive, of the transformer 189 are connected across the cathodes and grids of the tubes 166 to 169, respectively, the secondaries 201 to 204 of the transformer 193 are connected across the cathodes and grids of the tubes 175 to 178, respectively. The phase shifter 180 is desirably employed to insure that the voltages applied across the grids and cathodes of the tubes 166 to 169, inclusive are in phase or 180° out of phase, as the case may be, with the slip voltage induced in the windings 120 and 121 of the motors 100 and 101 and that the voltages applied across the cathode and grid of the tubes 175 to 178 are in phase or 180° out of phase with the slip voltage induced in the windings 119 and 122. The phase shifter 180 may also be employed to vary the phase relationship of the slip voltages induced in the windings 119 to 122 and those applied to the control tubes 166 to 169 and the tubes 175 to 178 as hereinafter described.

For low speed continuous operation of the motors 100 and 101 the slip voltage induced in the windings 119 to 122 is relatively high and at this time the exciter windings 133 and 134 are operated in series with each other, and the exciter windings 135 and 136 are operated in series with each other in order to produce voltages having greater amplitudes than the slip voltages. At this time the power tubes 162 to 165 and 171 to 178 operate as half-wave rectifiers. A contactor 209 is provided for changing the circuit from its connection for operating at cruising speed to a connection for operation at design speed and vice versa. Under high speed operating conditions the power tubes 162 to 165 and 171 to 178 operate as full-wave rectifiers with the exciter windings 133 and 134 operating as a center-tapped winding and the windings 135 and 136 also operating as a center-tapped winding. When the contacts of contactor 209 are in their uppermost position, the circuit is conditioned for low or cruising speed operation and the windings 133 and 134 are in series and the windings 135 and 136 are in series. When these contacts of the contactor 209 are in their lowermost position, the circuit is conditioned for high or design speed operation and the windings 133 and 134 are connected as a center-tapped winding and the windings 135 and 136 are connected as a center-tapped winding.

Reference is made to Figure 16 to explain the operation of the system of Figures 15a and 15b for cruising speed operation. In Figure 16 the dotted curve 211 represents the slip voltage induced in windings 120 and 121 of the motors 100 and 101 and the curve 212 represents the current which would normally flow in these windings if they were short circuited. At the low speed referred to the current lags the voltage by an angle somewhat less than 90°. As only the component of the current 212 which is in phase with the voltage 211 develops torque, a large part of the current in the windings 120 and 121 and the corresponding currents in the windings 102 and 103 as well as the windings 100 and 101 of the motors serves no useful purpose, but merely causes the motors to heat. In Figure 16 the curve 213 represents the current which would flow in the same windings 120 and 121 due to the voltage impressed across the winding by the exciter 132 if the exciter were connected directly thereto. This current is shown as having six times the frequency of the slip current but there is nothing critical about this relation.

By applying sufficient exciter voltage to insure that the amplitude of the high frequency current 213 is always greater than the amplitude of the slip current 212 the resultant current in the windings 120 and 121 of the motors 100 and 101 will always pass through zero at least once in each cycle of the high frequency exciter current as shown by the curve 214 which represents the sum of the currents 212 and 213 or the resultant current flowing in the windings 120 and 121 of the motors 100 and 101 due to the slip voltage and exciter voltage if the exciter were connected directly thereto. If, however, current is only allowed to flow in the windings 120 and 121 when it is in phase with the slip voltage 211, the resulting current will approximate that of the loops 216 and 217. It will be appreciated that the currents and voltages in only one phase of the windings 119 to 122 of the motors 100 and 101 are shown in Figure 16 and that the other phase provides torque when the voltage 211 in Figure 16 passes through zero. The high frequency excitation can be employed without employing excessive exciter voltages by reason of the tuned circuit including the condenser 155 although by employing higher exciter voltages it is possible to dispense with the condenser 155.

Assume that the motors 100 and 101 are operating at a low or cruising speed at a reduced applied voltage and the slip voltage 211 in the windings 120 and 121 has just passed through zero and is increasing in the positive direction, which condition is illustrated just to the right of the point 218 on the curves of Figure 16. At this time if the normal slip current 212 were allowed to flow, it would be in phase opposition to the voltage. However, as shown by the curve 214 the resultant current has also just passed through zero and therefore under control of the set 137 of grid controlled rectifier tubes. If it is also assumed that the contactor 125 is in its lowermost position, contactor 209 is in its uppermost position, and the contactors 206 and 207 are in their uppermost position, the circuit for the windings 120 and 121 may be traced from one terminal 221 of these windings through conductor 222, contact 223 of contactor 125, conductor 127, conductor 225, tube 162, conductor 226, contact 227 of contactor 209, conductor 228, winding 136 of the exciter 132, conductor 229, winding 135 of the exciter 132, contact 231 of the contactor 209, conductor 232 and conductor 128 to the other terminal 233 of the windings 120 and 121. This circuit also passes through the tube 163, which is in parallel with tube 162 since a parallel circuit can be traced from the conductor 225, tube 163 and conductor 235 to conductor 228.

By applying the slip voltage through the transformer windings 196 and 197 of the transformer 189 to the control tubes 166 and 167 so as to fire the tubes 162 and 163 whenever the current 214 is increasing in the upward direction in Figure 16 and slip voltage 211 is above the axis in Figure 16, current will flow through the tubes 162 and 163 as shown at 216 in Figure 16. It will be noted that the leads between the secondary windings 198 and 199 of the transformer 189 are crossed with respect to those from the transformer secondaries 196 and 197 so that the tubes 164 and 165 do not fire during this time. It will further be noted that the tubes 164 and 165 are connected in parallel with the tubes 162 and 163, respectively, for a current flow in the reverse direction, and when the slip voltage 211 (Figure 16) reverses, these tubes fire and allow current to flow in the reverse direction to provide the current loops 217. Similar circuits may be traced through the tubes 171 to 174, inclusive, for the other phase, including the windings 119 and 122 of the motors 100 and 101.

Since the slip voltage 238 in Figure 16 induced in the windings 119 and 122 of the motor is 90° out of phase with the slip voltage 211 in the windings 120 and 121 the result is that the tubes 162 and 163, providing for conduction in one direction in phase with the slip voltage in windings 120 and 121, will first fire; 90° later in the slip voltage cycle the tubes 171 and 172 of the other phase will fire; 90° later the tubes 162 and 163 are prevented from firing while the tubes 164 and 165 providing for reverse flow of current in the windings 120 and 122, will fire; then 90° later the tubes 171 and 172 for the windings 119 and 122 will be prevented from firing while the tubes 173 and 174 for these windings are permitted to fire and this operation continues. It will be seen that current which is not in phase with the slip voltage is prevented from flowing so that substantially all of the currents flowing in the windings are torque producing.

By rotating the taps 181 to 184 of the phase shifter 180 to advance the voltages applied to the control tubes 166 to 169, inclusive, and 175 to 178, inclusive, ahead of the corresponding slip voltages induced in the windings 119 to 122, inclusive, of the motors 100 and 101, the amount of current which is permitted to flow in phase with the slip voltage can be materially reduced without any substantial increase of flow of a current out of phase with the slip voltage 211. This is entirely apparent from the curve 240 of Figure 16 in which control voltage 240 has been advanced almost 90° from the slip voltage 211 and applied to the current curve 214 to produce the current loops 241.

In starting up the motors 100 and 101 to bring them up to cruising speed the contactor 125 may be operated to its uppermost position to place the resistors 123 and 124 across the windings 119 to 122 of the motors 100 and 101 and disconnect these windings from the exciter 132 and the grid controlled rectifier tubes. The contactor 105 then may be placed in its lowermost position to connect the alternating current windings 102 and 103 of the motors in series. The main contactor 109 can then be closed and as the motors come up to cruising speed the resistors 123 and 124 can be partly or entirely cut out at which time the motors take an extremely large current. By throwing the contactors 209, 206 and 207 to their uppermost positions and then throwing the contactor 125 to its lowermost position the exciter 132 and grid controlled rectifier tubes are thrown into operation to limit the current. Alternatively the motors may be started with the exciter 132 and tubes in circuit by having the contactor 125 in its lowermost position when the main contactor 109 is closed. Since the initial frequency in the windings 119 to 122 is the same as that applied to the motors 100 and 101 the voltage supplied by the exciter 132 should be of considerably higher frequency than the voltage supplied by the alternator 107 if the motors 100 and 101 are started with the exciter 132 in the circuit. In order to limit the current during starting, the phase shifter 180 may be advanced so as to advance the voltage applied to the control tubes 166 to 169 and 175 to 178, inclusive, with respect to the slip voltage.

To bring the motors from cruising speed up to high speed, it is merely necessary to simultaneously move the contactor 105 to its upper position to connect the primary windings 102 and 103 of the motors 100 and 101 in parallel and the contactor 125 to its uppermost position to disconnect the exciter 132 and tubes 162 to 165, inclusive, and 171 to 174, inclusive. The resistance 123 and 124 may be employed to limit the current when the motors 100 and 101 are changed from series to parallel operation, if necessary, and resistance can then be cut out to bring the motors up to speed. The motors will then operate relatively efficiently as induction motors. However, to increase their efficiency the exciter 132 may also be employed at the higher speed.

The slip voltages at the normal operating speed of the motors 100 and 101 are very much lower than at the low speed and the windings 133 and 134 can be converted to a center-tapped winding while at the same time converting windings 135 and 136 to a center-tapped winding. This is done by moving the contactor 209 to its lowermost position prior to moving the contactor 125 to its lowermost position to place the exciter in the circuit. Since the frequency of the slip voltage at high speed is low as compared to the exciter frequency, extremely accurate control on the amount of current flowing in the windings 119 to 122 of the motors 100 and 101 can be maintained by shifting the phase of the control voltages on the tubes 166 to 169, inclusive, and 175 to 178, inclusive, with respect to the slip voltage by means of the phase shifter 180.

By incorporating a supplementary control for the sets of tubes 137 the motors 100 and 101 may be carried up to synchronous speed or even to a considerable extent above synchronous speed corresponding to the frequency applied to the windings 102 and 103 of the motors 100 and 101. In such a supplemental control, instead of supplying the control voltage to the grid controlled tubes from the windings of the motors themselves, an independent rotary contactor, such as the rotary contactor 245 described in most detail below, may be synchronized with the slip voltage and then the voltage delivered thereby substituted for the control voltage derived from the slip voltage. After this substitution has been effected, slowing down the speed of the rotating contactor will cause the motors 100 and 101 to increase their speed and when the rotary contactor is brought to a stop the rotor will operate at the synchronous speed at which time direct current excitation is supplied to the motors to run them as synchronous motors. Similarly, reversing rotation of the contactor will cause the motors 100 and 101 to increase their speed above synchronous speed. In other words, the speed of the motors is a function of the sum or difference of the synchronous speed of the motors and the speed of the contactor.

In the system thus far described the firing of the control tubes has been analogous to so-called "amplitude control" in that the grid of a given control tube is held positive through several cycles of the high frequency current supplied by the exciter to keep the tubes in readiness to fire whenever a voltage of the correct potential is applied across their anode and cathode. The rotary contactor above referred to is shown, for purposes of illustration, as one which supplies a voltage of the same frequency as the exciter voltage, the contactor varying the phase of this control voltage with respect to the exciter voltage to produce a condition similar to what is known as "phase control" of grid controlled rectifier tubes instead of "amplitude control". In other words, the contactor 245 illustrated in Figure 15b supplies voltage to the control tubes 166 to 169, inclusive, and 175 to 178, inclusive, which is of the same frequency as the exciter voltage, but which is varied in phase with respect thereto at the frequency of the slip voltage.

The rotary contactor 245 may include a polyphase winding 246 supplied with poly-phase voltage such as two-phase voltage from a small alternator 247 having phase wound alternating current windings 248 and 249. The winding 246 may also function as a phase shifter so that phase relationships of the control voltages and exciter voltages may be adjusted during operation and is shown as being of the commutator type having a plurality of rotatably adjustable brushes 250, 251, 252 and 253 arranged to be simultaneously rotatably adjustable as indicated by the dotted circle 255. Oppositely disposed brushes 250 and 251 are connected across one winding 249 of the alternator 247 and the other oppositely disposed brushes 252 and 253 are connected across the winding 243 of the alternator 247. As indicated in Fig. 17, preferably the alternator 247 is on the same shaft as the exciter 132 so as to be driven at the same speed, thus insuring that a constant phase and frequency relationship exists between the exciter voltage 132 and the alternator voltage 247. The voltage applied to the winding 246 of the contactor 245 could be obtained from the exciter 132 but this voltage also includes a slip voltage component which would require high pass filters.

The rotary contactor 245 may also include stationary sets of contacts 257 and 258. The stationary contacts 257 may be arranged in a circle and be contacted by oppositely disposed brushes 259 and 260, the brush 259 being connected to a contact 262 on a rotating insulating member 263, and the brush 260 being connected to a contact plate 264 on a rotary insulating member 266. The contacts 258 are also arranged in a circle and are contacted by oppositely disposed rotating brushes 267 and 268, the brush 267 being connected to a contact plate 269 on a rotating insulating member 270, and the brush 268 being connected to a contact plate 272 on a rotating insulating member 273. The rotating insulating members 263, 266, 270, and 273, as well as the brushes 259, 260, 267 and 268 all rotate at the same speed which is a speed corresponding to the slip frequency. This slip speed may be obtained in various ways, for example, as shown in Fig. 17, by means of a mechanical differential 275 connected to the shaft of one of the main motors, for example, the motor 100, and to a synchronous motor 276 driven from the alternator 107 so as to drive the shaft 277 at the slip speed which shaft 277 may carry the rotary contact members 263, 262, 270 and 273 as well as the brushes 259, 260, 267 and 268.

The various contacts 257 of the rotary contactor 245 are connected to taps on the winding 246 such that rotation of the brushes 259 and 260 at a speed corresponding to the slip voltage will cause the voltage across the brushes 259 and 260 to be in phase with the exciter voltage supplied to the windings 120 and 121 of the motors 100 and 101 in one position of the brushes, and will cause this voltage to be retarded until it is nearly 180° out of phase with the corresponding exciter voltage upon 90° rotation of the brushes 259 and 260. Further rotation of the brushes will then gradually bring the voltages back into phase upon another 90° rotation of the brushes 259 and 260. For example, in the position of the brushes 259 and 260 shown, the control voltage across the brushes is in phase with the exciter voltage. This voltage in the position of the contactor elements 263 and 266 shown in the drawing is supplied to the primary 277 of a control transformer 298. Upon 90° rotation of the brushes 259 and 260 counterclockwise (Figure 15) the voltage is caused to lag until it is shifted nearly 180° out of phase with the exciter voltage. Further rotation of the brushes 259 and 260 as well as the contactor elements 263 and 266 applies the voltage across the brushes 259 and 260 to the primary winding 280 of the control transformer 281 and gradually brings it into phase with the exciter voltage upon 90° rotation and then back to nearly 180° out of phase upon further 90° rotation whereupon the voltage is transferred back to the primary winding 277 of the transformer 298.

The contacts 258 are similarly connected so as to alternately supply voltages to the primary winding 282 of the control transformer 283 and the primary winding 284 of a control transformer 285. In the position of the brushes 267 and 268 as shown, the voltage supplied to the transformer 285 has just been shifted nearly 180° out of phase with its corresponding exciter voltage and then discontinued and further rotation of these brushes will supply voltage to the primary 282 of the transformer 283 which is at first nearly 180° out of phase with its corresponding exciter voltage, but will be shifted back into phase upon 90° rotation of the brushes, and then back out of phase upon further rotation of the brushes.

The control for the sets of tubes 137 may be shifted from the control transformers 189 and 193 to the control transformers 298, 281, 283, and 285 by the contactors 206 and 207. That is to say, moving the central contacts of the contactors 206 and 207 to their lowermost position connects the secondaries 290 and 291 of the control transformer 298 across the grid and cathode of the control tubes 166 and 167. The secondaries 292 and 293 of the control transformer 281 are connected across the grids and cathodes of the control tubes 168 and 169 respectively. The secondaries 295 and 296 of the control transformer 283 are connected across the grid and cathode of the control tubes 175 and 176, respectively, and the secondaries 297 and 298 of the control transformer 285 are connected across the grids and cathodes of the tubes 177 and 178, respectively.

In the position of the rotary contactor 245 shown, the control transformer 281 is supplying voltage in phase with the exciter current in windings 120 and 121 of the motors 100 and 101 to the control tubes 166 and 167; 90° rotation of the brushes and contacts of the rotary contactor 245 will shift the voltage being supplied to the tubes 166 and 167 nearly 180° out of phase with its corresponding exciting current, and discontinue this voltage while brushes 267 and 268 and contact plates 270 and 272, feeding excitation to the control transformer 283, apply control voltage across the tubes 175 and 176 and bring this voltage into phase with its corresponding motor exciting current.

It will be seen that tubes 166 and 167, controlling conduction in windings 120 and 121 of the motors in one direction through the power tubes 162 and 163 can be controlled to provide flow of current in phase with the voltage in such windings. Power tubes 171 and 172 are the next set of tubes conditioned for flow of current in one direction in windings 119 and 122 in phase with the voltage induced in the said windings; tubes 164 and 165 are then conditioned for flow of current in the opposite direction in the windings 120 and 121, and then tubes 173 and 174 are conditioned for flow of current in the opposite direction in windings 119 and 122. This operation continues so that the rotating contactor 245 controls the excitation to the motors 100 and 101. It is apparent that a relatively large number of contacts 257 and 258 on the rotary commutator may be provided for a gradual change of phase of the controlling voltage relative to their corresponding motor currents.

As shown in the single line diagrammatic representation of the control system shown in Figure 17, discontinuing power to the synchronous motor 276 and transferring the drive by the synchronous motor to a variable speed motor 300, and gradually slowing this motor down until the speed of the motor 300 is the same as the motor 100, the rotary contactor 245 will be brought to a standstill at which time the motors 100 and 101 are operating at synchronous speed, and then by still further slowing down the motor 300 so as to cause reverse rotation of the rotary contactor 245 the motors 100 and 101 may be caused to run above synchronism.

It will thus be seen that by changing the speed of a small control motor 300, the motors 100 and 101 can be caused to run at synchronous speed, or at any desired speed above or below synchronous speed, over a relatively wide range. The phase shifting control due to the rotary contactor 245 may be designed to provide substantially uniform total excitation of the motors 100 and 101 at any speed thereof, as the excitation in the windings 119 and 122 of the motors rises as the excitation in windings 120 and 121 falls, and vice versa. Excitation current curves very closely approximating sine functions may be provided at any slip frequency and the slip frequency may be reduced to zero to cause synchronous operation of the motors 100 and 101 while still maintaining excitation of the windings 119 to 122 substantially constant.

In bringing the motors 100 and 101 from cruising speed up to their rated speed as induction motors under full rated voltage the resistors 123 and 124 of Figure 15 may be employed to limit the current, or the phase shifter 180 may be employed by advancing the phase of the control voltages relative to the slip current as hereinbefore described. As the slip voltage decreases due to decrease in the slip as the motors decrease in speed, the exciter voltage may be decreased and the phase shifter 180 may be operated to bring the control voltages into phase with the slip voltages. After the motors are brought to their rated speed as induction motors under rated voltage, either using the resistors 123 and 124, or the phase shifter 180, the windings 119 to 122 of the motors 100 and 101 may, if desired, be short circuited through the contactor 125 by cutting out the resistors 123 and 124 so that the motors continue to operate as induction motors with relatively high efficiency. If a higher speed is desired, control can be transferred to rotary contactor 245 by operation of the contactors 206, 207 and 209 and the speed of the rotary contactor 245 gradually changed to bring the motors to any desired speed either synchronous or above or below synchronous speed.

It will thus be seen that I have provided a complete system by which induction motors may be operated at relatively low speeds and high efficiency with less than rated voltage applied to the primary windings thereof and that such induction motors may be brought to their rated speed and rated voltage as induction motors and then, if desired, their speed can be controlled over a wide range while still maintaining efficient operation of the motors. So far as the high frequency excitation control systems of the present invention are concerned, the illustrated induction motors having two rotors and two stators are representative of induction motors in general which have a phase wound winding in which slip voltages are induced although the control systems of the present invention are particularly applicable to the type of induction motors shown. It will be apparent that one or more machines such as the motors 100 and 101 can be employed as alternating current generators with the high frequency excitation system of the present invention and that such generators can be operated at other than the synchronous speed corresponding to their output voltages.

While I have disclosed the preferred embodiments of my invention, it is understood that the details thereof may be varied within the scope of the following claims.

What I claim is:

1. In an induction motor, a winding upon one member of said motor, means for energizing said winding with alernating current to produce a rotating field in said motor, a phase wound winding upon another member of said motor positioned to have slip voltages induced therein by said field, gas filled tubes connected to said phase wound winding and completing circuits through said phase wound winding, said tubes having control electrodes for controlling starting of current flow through said tubes, an exciter supplying voltages to said phase wound winding of higher frequency than the frequency of said alternating current and of sufficiently high frequency and magnitude to cause the currents flowing therein as a result of said slip voltages to pass through zero at least several times during each half cycle of said slip voltages whereby said tubes retain substantially continuous control of said currents, and means including circuits connected to said electrodes for controlling said tubes to limit the currents flowing in said phase wound winding substantially to currents which are in phase with the slip voltages induced therein.

2. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound windings and completing circuits through said phase wound winding, said tubes having control electrodes for controlling starting of current flow through said tubes, an exciter having windings in series with said tubes and with said phase wound windings for supplying voltages of higher frequency than the frequency of said alternating current and of sufficiently high frequency and magnitude to cause the currents flowing therein as a result of said slip voltages to pass through zero at least several times during each half cycle of said slip voltages, whereby said tubes retain substantially continuous control of said currents, and means including circuits connected to said electrodes for controlling said tubes to limit the currents flowing in said phase wound winding substantially to currents which are in phase with the slip voltages induced therein.

3. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound windings and completing circuits through said phase wound winding, said tubes having control electrodes for controlling starting of current flow through said tubes, exciter circuits having an exciter therein supplying voltages to said phase wound winding of sufficiently high frequency and magnitude to cause the currents flowing therein as a result of said slip voltages to pass through zero at least several times during each half cycle of said slip voltages whereby said tubes retain substantially continuous control of said currents, means for maintaining said exciter circuits substantially in resonance at the frequency of the voltages supplied by said exciter, and means including circuits connected to said electrodes for controlling said tubes to limit the current flowing in said phase wound winding substantially to currents which are in phase with the slip voltages induced therein.

4. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound winding and completing circuits through said phase wound winding, said tubes having control electrodes for controlling starting of current flow through said tubes, an exciter supplying voltages to said phase wound winding of higher frequency than the frequency of said alternating current and of sufficiently high frequency and magnitude to cause the currents flowing therein as a result of said slip voltages to pass through zero at least several times during each half cycle of said slip voltages whereby said tubes retain substantially continuous control of said currents, and means including circuits connected to said electrodes and including a phase shifter for said slip voltages for controlling said tubes to limit the currents flowing in said phase wound winding substantially to currents which are in phase with the slip voltages induced therein.

5. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound windings and completing circuits through said phase wound winding, said tubes having control electrodes for controlling starting of current flow through said tubes, means responsive to said slip voltages and including circuits connected to said electrodes for controlling said tubes to limit the currents flowing in said phase wound winding substantially to currents which are in phase with the slip voltages induced therein, means for transferring control of said tubes to other voltages of the same frequency as said slip voltages, and means for varying the frequency of said other voltages to vary the speed of said motor.

6. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound windings and completing circuits through said phase wound winding, said tubes having control electrodes for controlling starting of current flow through said tubes, means responsive to said slip voltages and including circuits connected to said electrodes for controlling said tubes to limit the currents flowing in said phase wound winding substantially to currents which are in phase with the slip voltages induced therein, means for transferring control of said tubes to other voltages of the same frequency as said slip voltages, and means for varying the frequency of said other voltages to vary the speed of said motor, said last-named means including means for varying the frequency of said other voltages through zero to cause said motor to run at synchronous speed when said last-named frequency is zero and to run above synchronous speed when said last-named frequency has passed through zero.

7. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound winding and completing circuits through said phase wound winding, said tubes having control electrodes for controlling starting of current flow through said tubes, an exciter supplying voltages to said phase wound winding of higher frequency than the frequency of said alternating current and of sufficiently high frequency and magnitude to cause the currents flowing therein as a result of said slip voltages to pass through zero at least several times during each half cycle of said slip voltages whereby said tubes retain substantially continuous control of said currents, and means responsive to control voltages having the same frequency as said slip voltages for controlling said tubes to limit the currents flowing in said phase wound winding substantially to currents which are in phase with the slip voltages induced therein.

8. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound winding and completing circuits through said phase wound winding, said tubes having control electrodes for controlling starting of current flow through said tubes, an exciter supplying voltages to said phase wound winding of sufficiently high frequency and magnitude to cause the currents flowing therein as a result of said slip voltages to pass through zero at least several times during each half cycle of said slip voltages whereby said tubes retain substantially continuous control of said currents, means responsive to control voltages having the same frequency as said slip voltages for controlling said tubes to limit the currents flowing in said phase wound winding substantially to currents which are in phase with the slip voltages induced therein, and means for varying the frequency of said control voltages to vary the speed of said motor.

9. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound winding and completing circuits through said phase wound winding, said tubes having control electrodes for controlling starting of current flow through said tubes, an exciter supplying voltages to said phase wound winding of higher frequency than the frequency of said alternating current and of sufficiently high frequency and magnitude to cause the currents flowing therein as a result of said slip voltages to pass through zero at least several times during each half cycle of said slip voltages whereby said tubes retain substantially continuous control of said currents, and means including circuits connected to said electrodes for controlling said tubes to limit the currents flowing in said phase wound winding substantially to currents which are in phase with the slip voltages induced therein, said last-named means including means for supplying voltages to said control electrodes at the frequency of the voltages supplied by said exciter and means for varying the phase of the voltages supplied to said control electrodes at the frequency of said slip voltages.

10. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound winding and completing circuits through said phase wound winding, said tubes having control electrodes for controlling starting of current flow through said tubes, an exciter supplying voltages to said phase wound winding of higher frequency than the frequency of said alternating current and of sufficiently high frequency and magnitude to cause the currents flowing therein as a result of said slip voltages to pass through zero at least several times during each half cycle of said slip voltages whereby said tubes retain substantially continuous control of said currents, and means responsive to control voltages having the same frequency as said slip voltages for controlling said tubes to limit the currents flowing in said phase wound winding substantially to currents which are in phase with the slip voltages induced therein, said last-named means including means for supplying voltages to said control electrodes at the frequency of the voltages supplied by said exciter and means for varying the phase of the voltages supplied to said control electrodes at the frequency of said control voltages.

11. In an induction motor, a winding upon one member of said motor, means for energizing said winding with alternating current to produce a rotating field in said motor, a phase wound winding upon another member of said motor positioned to have slip voltages induced therein by said field, gas filled tubes connected to said phase wound winding and completing circuits through said phase wound winding, said tubes having control electrodes for controlling starting of current flow through said tubes, an exciter supplying voltages to said phase wound winding of sufficiently high frequency and magnitude to cause the currents flowing therein as a result of said slip voltages to pass through zero at least several times during each half cycle of said slip voltages whereby said tubes retain substantially continuous control of said currents, means responsive to control voltages having the same frequency as said slip voltages for controlling said tubes to limit the currents flowing in said phase wound winding substantially to current which are in phase with the slip voltages induced therein, and means for varying the frequency of said control voltages to vary the speed of said motor.

LELAND CLAY WEATHERS.

REFERENCES CITED

The following references are of record in the file of this patent:

UNITED STATES PATENTS

| Number | Name | Date |
|---|---|---|
| Re. 20,568 | Bedford | Dec. 7, 1937 |

(Other references on following page)

UNITED STATES PATENTS

| Number | Name | Date |
|---|---|---|
| 587,937 | Davis | Aug. 10, 1897 |
| 1,411,862 | Meyer | Apr. 4, 1922 |
| 1,628,464 | Hobart | May 10, 1927 |
| 1,822,369 | Ossanna et al. | Sept. 8, 1931 |
| 2,209,364 | Sweeny | July 30, 1940 |
| 2,213,945 | Alexanderson | Sept. 10, 1940 |
| 2,230,731 | Stohr | Feb. 4, 1941 |
| 2,319,625 | Ostrander | May 18, 1943 |

FOREIGN PATENTS

| Number | Country | Date |
|---|---|---|
| 281,712 | Great Britain | Apr. 19, 1928 |
| 471,113 | Great Britain | Aug. 23, 1937 |
| 348,341 | Germany | Feb. 6, 1922 |